United States Patent
Hoyne et al.

(10) Patent No.: US 10,600,031 B2
(45) Date of Patent: Mar. 24, 2020

(54) AUTOMATED DEVICE COMMUNICATION LINKING

(71) Applicant: INTERNATIONAL BUSINESS MACHINES CORPORATION, Armonk, NY (US)

(72) Inventors: Ronan R. Hoyne, Dublin (IE); John Kennedy, Dublin (IE); Paula Prendergast, Meath (IE); Ronan Redican, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 15/647,708

(22) Filed: Jul. 12, 2017

(65) Prior Publication Data

US 2019/0019153 A1    Jan. 17, 2019

(51) Int. Cl.
*G06F 15/16*     (2006.01)
*G06Q 10/10*    (2012.01)
(Continued)

(52) U.S. Cl.
CPC .......... *G06Q 10/107* (2013.01); *G06Q 10/10* (2013.01); *H04L 51/02* (2013.01); *G06Q 10/06* (2013.01); *H04L 51/04* (2013.01); *H04L 51/12* (2013.01)

(58) Field of Classification Search
CPC ...... G06Q 10/107; G06Q 10/10; H04L 51/02; H04L 51/04
(Continued)

(56) References Cited

U.S. PATENT DOCUMENTS 7,856,469 B2    12/2010  Chen et al.
9,473,432 B2    10/2016  Chung et al.
(Continued)

FOREIGN PATENT DOCUMENTS

WO    2015080563    6/2015

OTHER PUBLICATIONS

Maina, Tirus Muya; Instant Messaging an Effective Way of Communication in Workplace; URL: https://arxiv.org/ftp/arxiv/papers/1310/1310.8489.pdf; retrieved from the Internet Jan. 30, 2017; 8 pages.

(Continued)

*Primary Examiner* — Imad Hussain
(74) *Attorney, Agent, or Firm* — Schmeiser, Olsen & Watts; Michael A. Petrocelli

(57) ABSTRACT

A method and system for improving an automated online message linking system is provided. The method includes automatically selecting keywords in an online transcript generated via a messaging software application. The keywords are analyzed with respect to technical skill based software tags stored within a database repository. Contribution attributes associated with user communications are determined and associated software code is generated and executed. Users are ranked within a multidimensional array of a memory device thereby modifying a functionality of the specialized memory device. The multidimensional array is scanned with respect to the technical skill based software tags and matrix based weightings are generated. A group of users is automatically selected and hardware devices are automatically connected to the messaging hardware device.

18 Claims, 6 Drawing Sheets

(51) Int. Cl.
*H04L 12/58* (2006.01)
*G06Q 10/06* (2012.01)
(58) Field of Classification Search
USPC .......................................... 709/206
See application file for complete search history.

(56) References Cited

U.S. PATENT DOCUMENTS

| | | | |
|---|---|---|---|
| 2009/0307612 A1* | 12/2009 | Singh .................... | G06Q 10/10 715/758 |
| 2011/0119264 A1* | 5/2011 | Hu ........................ | G06Q 10/00 707/728 |
| 2014/0067797 A1* | 3/2014 | Kennedy ........ | G06Q 10/063112 707/723 |
| 2016/0352906 A1* | 12/2016 | Jandwani ............ | H04M 3/5232 |
| 2016/0380933 A1* | 12/2016 | Topaltzas .............. | H04L 51/046 709/206 |
| 2018/0276219 A1* | 9/2018 | Contractor ..... | G06Q 10/063112 |

OTHER PUBLICATIONS

Czerwinski, Mary et al.; Instant Messaging: Effects of Relevance and Timing; URL: http://research-srv.microsoft.com/en-us/um/people/marycz/hci2000.pdf; retrieved from the Internet Jan. 30, 2017; 6 pages.

Anonymous; Determining relevant contributor potential to ongoing instant messaging interactions; ip.com; IPCOM000243735D; Oct. 15, 2015; 5 pages.

* cited by examiner

AUTOMATED DEVICE COMMUNICATION LINKING

FIELD

The present invention relates generally to a method for linking communications between devices and in particular to a method and associated system for improving online message software technology associated with communications between hardware devices by automatically connecting the hardware devices for improving an efficiency with respect to device communications.

BACKGROUND

Accurately enabling communications between devices typically includes an inaccurate process with little flexibility. Determining communication solutions with respect to operational features of devices may include a complicated process that may be time consuming and require a large amount of resources. Accordingly, there exists a need in the art to overcome at least some of the deficiencies and limitations described herein above.

SUMMARY

A first aspect of the invention provides an automated online message linking improvement method comprising: automatically selecting, by a processor of a messaging hardware device of a first user, specified keywords in an online transcript generated via a messaging software application of the messaging hardware device, the online transcript associated with the first user; analyzing in real time, by the processor, the specified keywords with respect to additional keywords of additional previously generated online transcripts and technical skill based software tags stored within a remotely located specialized database repository, the additional previously generated online transcripts and the technical skill based software tags associated with a plurality of additional users; determining, by the processor based on results of the analyzing, contribution attributes associated with associated communications between the plurality of additional users and the additional previously generated online transcripts with respect to the subject matter of the online transcript; generating, by the processor based on results of the analyzing and the contribution attributes, software code indicating results of the analyzing and the contribution attributes; executing, by the processor, the software code; ranking in real time, by the processor in response to the executing the software code, the plurality of additional users within a multidimensional array of a specialized memory device thereby modifying a functionality of the specialized memory device; iteratively scanning in real time, by the processor, the multidimensional array with respect to the technical skill based software tags; generating, by a processor based on results of the iteratively scanning, matrix based weightings associated with the plurality of additional users; automatically selecting, by the processor based on the matrix based weightings, a group of users of the plurality of additional users; and automatically connecting, by the processor based on results of the automatically selecting, hardware devices of the group of users to the messaging hardware device of the first user resulting in communications between the messaging software application of the messaging hardware device of the first user and messaging software applications of the hardware devices of the group of users.

A second aspect of the invention provides a computer program product, comprising a computer readable hardware storage device storing a computer readable program code, the computer readable program code comprising an algorithm that when executed by a processor of a messaging hardware device implements an automated online message linking improvement method, the method comprising: automatically selecting, by the processor, specified keywords in an online transcript generated via a messaging software application of the messaging hardware device, the online transcript associated with a first user of the messaging hardware device; analyzing in real time, by the processor, the specified keywords with respect to additional keywords of additional previously generated online transcripts and technical skill based software tags stored within a remotely located specialized database repository, the additional previously generated online transcripts and the technical skill based software tags associated with a plurality of additional users; determining, by the processor based on results of the analyzing, contribution attributes associated with associated communications between the plurality of additional users and the additional previously generated online transcripts with respect to the subject matter of the online transcript; generating, by the processor based on results of the analyzing and the contribution attributes, software code indicating results of the analyzing and the contribution attributes; executing, by the processor, the software code ranking in real time, by the processor in response to the executing the software code, the plurality of additional users within a multidimensional array of a specialized memory device thereby modifying a functionality of the specialized memory device; iteratively scanning in real time, by the processor, the multidimensional array with respect to the technical skill based software tags; generating, by a processor based on results of the iteratively scanning, matrix based weightings associated with the plurality of additional users; automatically selecting, by the processor based on the matrix based weightings, a group of users of the plurality of additional users; and automatically connecting, by the processor based on results of the automatically selecting, hardware devices of the group of users to the messaging hardware device of the first user resulting in communications between the messaging software application of the messaging hardware device of the first user and messaging software applications of the hardware devices of the group of users.

A third aspect of the invention provides a messaging hardware device comprising a processor coupled to a computer-readable memory unit, the memory unit comprising instructions that when executed by the computer processor implements an automated online message linking improvement method comprising: automatically selecting, by the processor, specified keywords in an online transcript generated via a messaging software application of the messaging hardware device, the online transcript associated with a first user of the messaging hardware device; analyzing in real time, by the processor, the specified keywords with respect to additional keywords of additional previously generated online transcripts and technical skill based software tags stored within a remotely located specialized database repository, the additional previously generated online transcripts and the technical skill based software tags associated with a plurality of additional users; determining, by the processor based on results of the analyzing, contribution attributes associated with associated communications between the plurality of additional users and the additional previously generated online transcripts with respect to the subject matter of the online transcript; generating, by the processor based on results of the analyzing and the contribution attributes, software code indicating results of the analyzing and the contribution attributes; executing, by the processor, the software code; ranking in real time, by the processor in response to the executing the software code, the plurality of additional users within a multidimensional array of a specialized memory device thereby modifying a functionality of the specialized memory device; iteratively scanning in real time, by the processor, the multidimensional array with respect to the technical skill based software tags; generating, by a processor based on results of the iteratively scanning, matrix based weightings associated with the plurality of additional users; automatically selecting, by the processor based on the matrix based weightings, a group of users of the plurality of additional users; and automatically connecting, by the processor based on results of the automatically selecting, hardware devices of the group of users to the messaging hardware device of the first user resulting in communications between the messaging software application of the messaging hardware device of the first user and messaging software applications of the hardware devices of the group of users.

The present invention advantageously provides a simple method and associated system capable of accurately enabling communications between devices.

DETAILED DESCRIPTION

Figure 1:
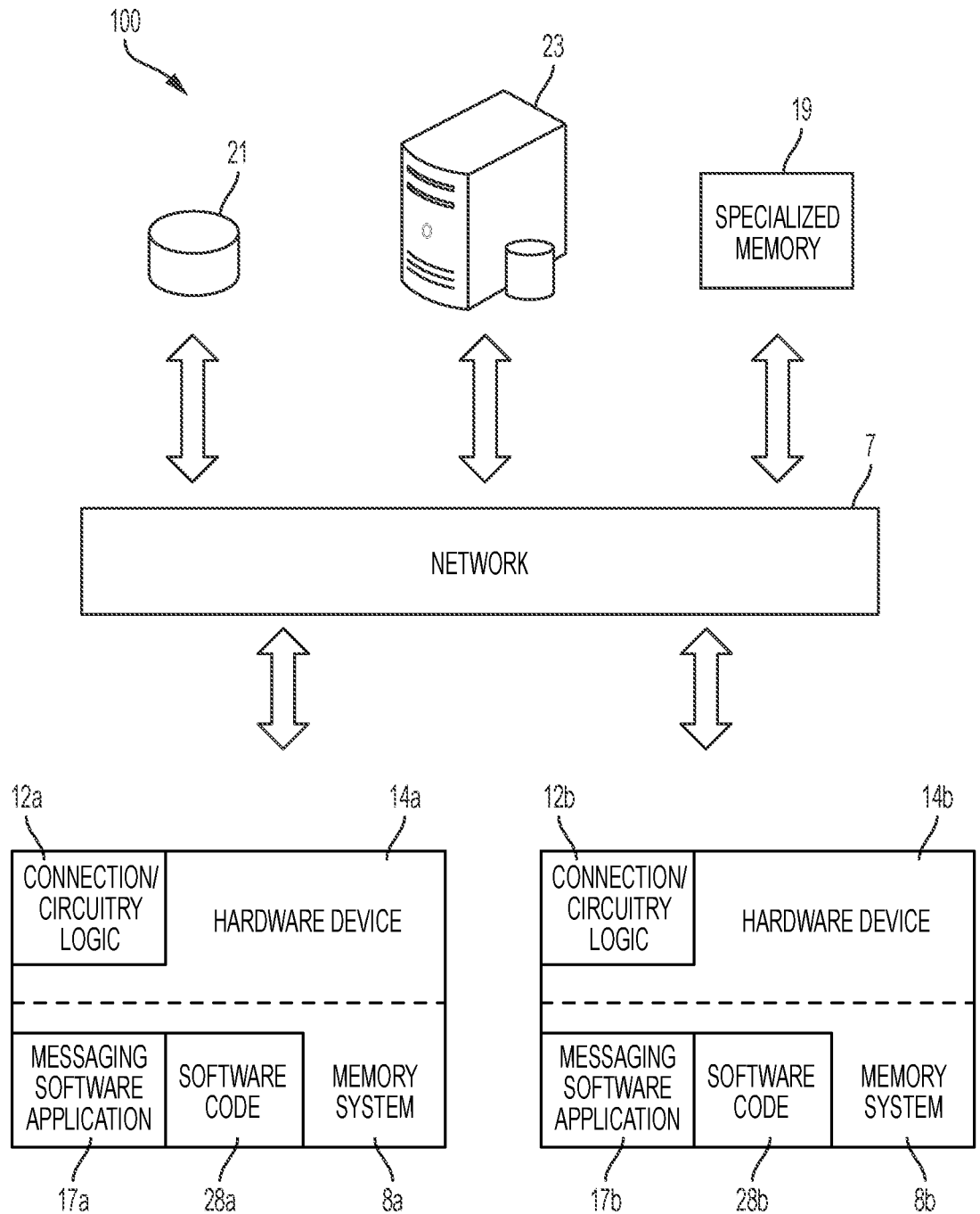
FIG. 1 illustrates a system for improving message software technology associated with connections and communications between hardware devices, in accordance with embodiments of the present invention.

FIG. 1 illustrates a system 100 for improving message software technology associated with connections and communications between hardware devices, in accordance with embodiments of the present invention. System 100 is enabled to determine possible software messaging users by executing software for examining previously generated message transcripts and resolution documents and matching relevant keywords. In response, the users are ranked by level of contribution with respect to the previously generated message transcripts and software code is generated for automatically connecting devices (and associated messaging software) of the users based on the rankings. Additionally, system 100 is configured to generate specialized software code for generating multidimensional arrays for efficiently analyzing keywords and associated solutions via usage of weighting heuristic code within the multidimensional arrays. The weighting heuristic code is configured to converge with specified traits for linking back to the ranked users for transmission back to an instant messaging user interface for determining relevant communication links and contacts.

System 100 of FIG. 1 includes a device (or hardware system) 23 requiring repair or maintenance, a specialized memory device (or system) 19, and a database system 21 connected through a network 7 to a hardware device 14a and a hardware device 14b. Hardware device 14a comprises connection circuitry/logic 12a and a (specialized) memory system 8a. Memory system 8a comprises messaging software application 17a and software code 28a. Memory system 8a may include a single memory system. Alternatively, memory system 8a may include a plurality of memory systems. Hardware device 14b comprises connection circuitry/logic 12b and a (specialized) memory system 8b. Memory system 8b comprises messaging software application 17b and software code 28b. Memory system 8b may include a single memory system. Alternatively, memory system 8b may include a plurality of memory systems. Device 23, database system 21, hardware device 14a, and hardware device 14b each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, device 23, database system 21, hardware device 14a, and hardware device 14b may each comprise a specialized hardware device comprising specialized (non-generic) hardware and circuitry (i.e., specialized discrete non-generic analog, digital, and logic based circuitry) for (independently or in combination) executing a process described with respect to FIGS. 1-6. The specialized discrete non-generic analog, digital, and logic based circuitry (e.g., connection circuitry/logic 12a and 12b, etc.) may include proprietary specially designed components (e.g., a specialized integrated circuit, such as for example an Application Specific Integrated Circuit (ASIC) designed for only implementing an automated process for improving message software technology associated with connections and communications between hardware devices. Network 7 may include any type of network including, inter alia, a local area network, (LAN), a wide area network (WAN), the Internet, a wireless network, etc.

System 100 enables a user to enter a phrase into an instant messaging chat user interface such that the phrase is automatically parsed and compared to repository comprising previously retrieved instant messages and associated software system references. In response, additional users and associated devices are automatically selected for connection and communication via messaging software applications 17a and 17b. Additionally, archived console logs or requests associated with messaging software applications 17a and 17b are executed for running actions associated with the previously retrieved instant messages and associated software system references. System 100 enables the following process for improving message software technology associated with connections and communications between hardware devices:

In response to an instant messaging chat session being initiated, specified keywords are selected and highlighted for enabling an aggregated weighted search of local user email file in combination with social network data repositories including a ticket reference repository database (e.g., database system 21). The ticket reference repository database may comprise an index of previous stored instant messaging chat transcripts with respect to various keywords by the instant messaging chats. When an instant messaging chat session is initiated and specified phrases or error codes are selected, a search is executed for a specified keyword with respect to the ticket reference repository database and if the search is determined to be successful, an associated chat transcript(s) id is returned. For example, specified databases are enabled to store information with respect to persistent chat sessions comprising where text is stored in the specified databases. Additionally, specific skill set information stored within a user's profile may be accessible by other users such that when a chat transcript is being saved, an entry in the ticket reference repository is created with a unique identifying chat transcript ID thereby enabling prioritized keywords to be stored for future search usage. Subsequently, a ticket reference repository is queried for the prioritized keywords and associated skillset. For example, the following strings are located:

Keyword string: {Client Crash, Server Crash, {Server Name} Error 234}

Skillset string: {Client, Client Crash,Server Crash, {Server Name} Crash} [known skillset detection]

Therefore, tickets matching both strings to a closest degree are returned. Likewise, an instant messaging chat reference for the TicketRef is returned as follows:

{TicketRef; {Client Crash, Error 234}; {Client, Client Crash, Crash}; IMChatRef}.

The IMChatRef is reviewed and scanned through an associated chat transcript for various criteria such that leading participants in terms of chat contributions are determined and ranked by order within a multidimensional array comprising the following values: contribution incidence; keyword incidence; skillset incidence; userID numeric value (i.e., a given id for the given participant), etc. For example:
{{5, 0, 0, 000007}, {4, 0, 0, 000003}, {3, 0, 0, 000004}, {2, 0, 0, 000002}, {1, 0, 0, 000005}, {0, 0, 0, 000008}, {0, 0, 0, 000001}}.

Additionally, contributions for all participants are scanned for {Client Crash, Error 234} within a chat comprising multiple iterations of the multidimensional array occurring thereafter as follows:
{{5, 4, 0, 000007}, {4, 4, 0, 000003}, {3, 2, 0, 000004}, {2, 1, 0, 000002}, {1, 1, 0, 000005}, {0, 0, 0, 000008}, {0, 0, 0, 000001}}

The process is repeated for skillset incidence for {Client, Client Crash, Crash} {{5, 4, 4, 000007}, {4, 4, 4, 000003}, {3, 2, 1, 000004}, {2, 1, 1, 000002}, {1, 1, 0, 000005}, {0, 0, 0, 000008}, {0, 0, 0, 000001}}

The aforementioned process may be repeated for a number associated with a highest ranked ticket reference/IMChatRef with respect to a given threshold (e.g., 20 top matches). Additionally, a compilation for differing multidimensional arrays may be subjected to different matrix/array operations. For example, a fourth entry in each collection array may reference 'online participants' in an instant messaging context (e.g. users 000007, 000008, 000016, 000020, 000034 are determined to be online from the userIDs found in the collection of multidimensional arrays). Associated individual results may be collated with respect to new concatenated arrays (re-sorted by userID order) as follows:
{{5, 4, 4, 000007}, {0, 0, 0, 000008}, {0, 0, 0, 000016}}, {0, 0, 0, 000020}, {0, 0, 0, 000034}}
{{3, 3, 0, 000007}, {1, 1, 1, 000008}, {4, 4, 2, 000016}}, {3, 3, 2, 000020}, {1, 0, 0, 000034}}
{{7, 6, 0, 000007}, {1, 1, 1, 000008}, {3, 3, 2, 000016}}, {2, 1, 1, 000020}, {4, 0, 0, 000034}}

Various matrix operations may be executed such that if a skillset is considered comprise an important factor, it may be doubled with an extra weighting value in terms of sorting. For example, arrays may comprise a weighting heuristic of {1, 2, 3} such that a skillset is considered to be 1.5 time more important than a keyword. Therefore, an additional operation may be applied to concatenate a multidimensional array into a one multidimensional array (i.e., by adding the values). A resulting multidimensional array may comprise added internal values per each userID sorted as follows:
{{50, 000007}, {35, 000016}, {20, 000020}, {18, 000008}, {5, 000034}}

Therefore, users 000007, 000016, and 000020 comprise a first three suggested participants for a user.

Figure 2:
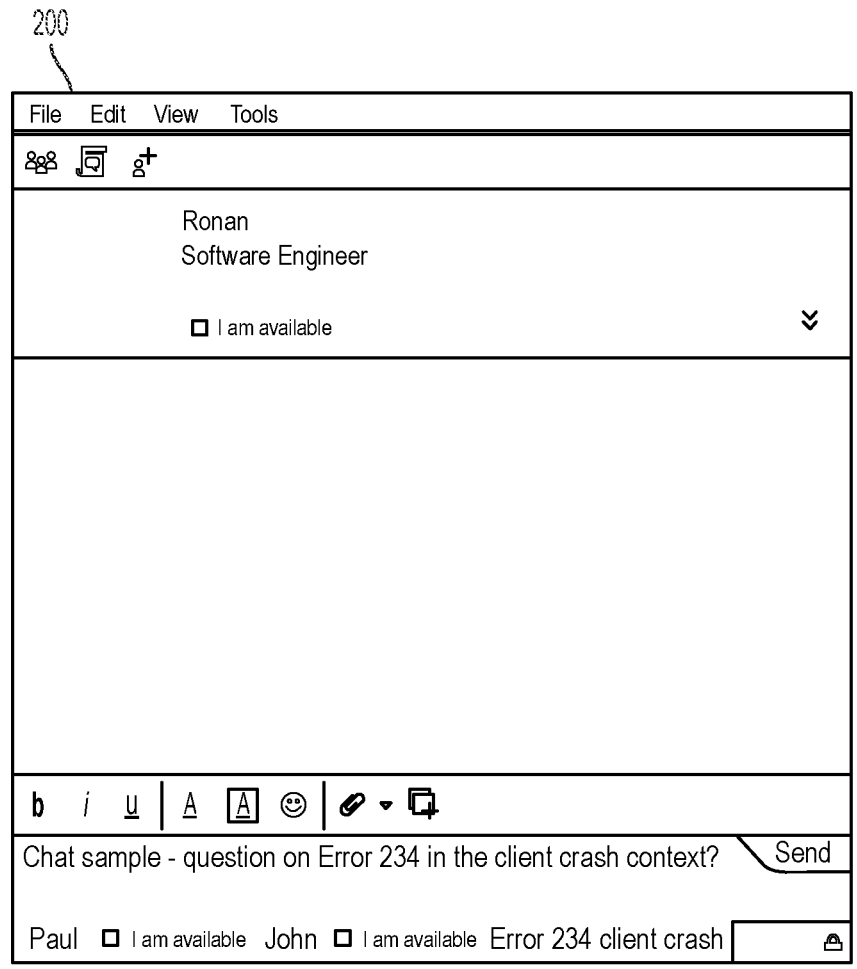
FIG. 2 illustrates a graphical user interface (GUI) executed by the system of FIG. 1 for presenting results of an aggregated search, in accordance with embodiments of the present invention.

FIG. 2 illustrates a graphical user interface (GUI) 200 executed by system 100 of FIG. 1 for presenting results of an aggregated search, in accordance with embodiments of the present invention. Results of the aggregated search are returned by highlighting a set number of available instant messaging contacts in combination with associated context parameters. The context parameters may be added to or removed in accordance with an ongoing progression of a messaging chat. Therefore, with respect to a server crash in a cloud, system 100 may verify that previous crashes for a server have occurred from the specified instant messaging chat history. Additionally, a specified instant messaging chat may be attached to previous logs collected. Likewise, a request for determining logs or debug files to be gathered based on the specified instant messaging chat history may be enabled. For example, if a server cloud A is determined to have crashed two weeks previously, an associated chat text could be: read and a console log may be retrieved thereby speeding up a (data or operational) recovery process.

Figure 3:
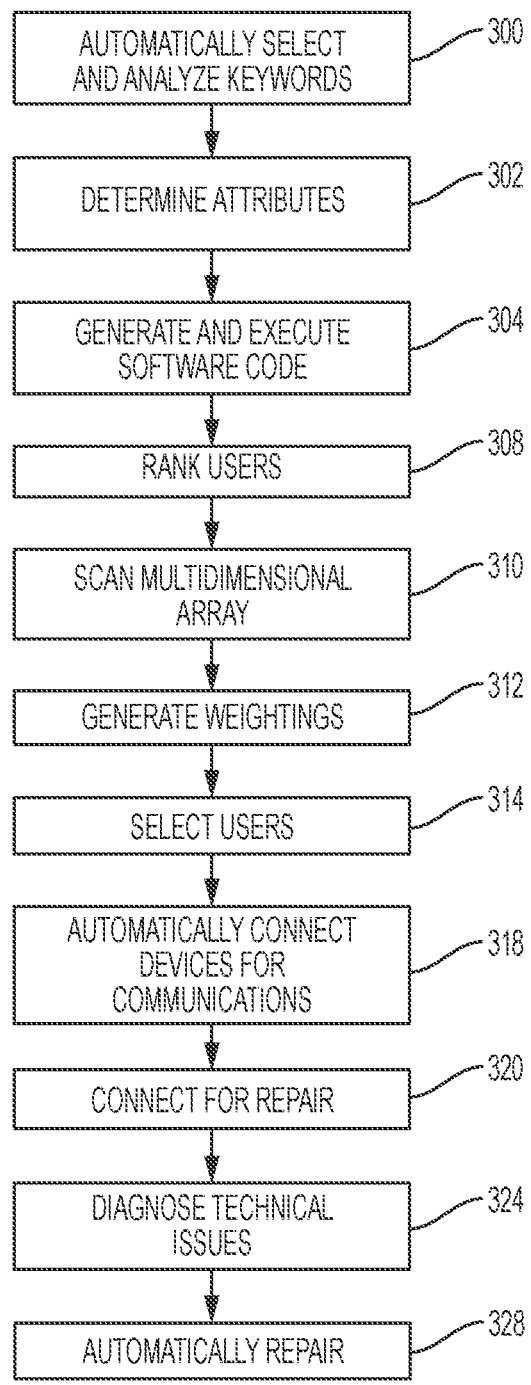
FIG. 3 illustrates an algorithm detailing a process flow enabled by the system of FIG. 1 for improving message software technology associated with connections and communications between hardware devices, in accordance with embodiments of the present invention.

FIG. 3 illustrates an algorithm detailing a process flow enabled by system 100 of FIG. 1 for improving message software technology associated with connections and communications between hardware devices, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by device 23, database system 21, hardware device 14a, and hardware device 14b of FIG. 1. In step 300, specified keywords in an online transcript generated via a messaging software application of a messaging hardware device are automatically selected. The online transcript is associated with a user. Additionally, the specified keywords are analyzed (in real time) with respect to additional keywords of additional previously generated online transcripts and technical skill based software tags stored within a remotely located specialized database repository. The additional previously generated online transcripts and technical skill based software tags are associated with additional users. The messaging software application may be hard coded within the messaging hardware device. In step 302, contribution attributes associated with associated communications between the additional users and the additional previously generated online transcripts are analyzed with respect to the subject matter of the online transcript. In step 304, software code is generated based on results of steps 300 and 302. The software code is executed thereby indicating results of steps 300 and 302. In step 308, the additional users are ranked (in real time) in response execution of the software code. The additional users are ranked within a multidimensional array of a specialized memory device thereby modifying a functionality of the specialized memory device. The ranking process may be performed with respect to the additional keywords and technical skill based software tags. In step 310, the multidimensional array is iteratively scanned (in real time) with respect to the technical skill based software tags. The iterative scanning process may be performed until a specified threshold has been exceeded. In step 312, matrix based weightings associated with the additional users are generated. In step 314, a group of users are automatically selected (from the additional users) based on the matrix based weightings. In step 318, hardware devices (of the group of users) are automatically connected to the messaging hardware device of the user (based on the automatic selection of step 314) resulting in communications between the messaging software application of the messaging hardware device and messaging software applications of the hardware devices of the group of users. In step 320, the messaging hardware device automatically connected to a hardware system requiring repair. The connection process is executed based on results of the communications of step 318. In step 324, technical issues with the hardware system are automatically diagnosed. In step 328, the technical issues are automatically repaired. The technical issues may include hardware based problems with the hardware system. For example, the hardware problems may include, inter alia, open circuit paths, defective components, electrical signal issues, storage issues, cooling hardware issues, etc. Additionally, the technical issues may software based problems with the hardware system. For example, the software based problems may include, inter alia, software code issues, software update issues, signal conflicts, computer viruses or malware issues, etc.

Figure 4:
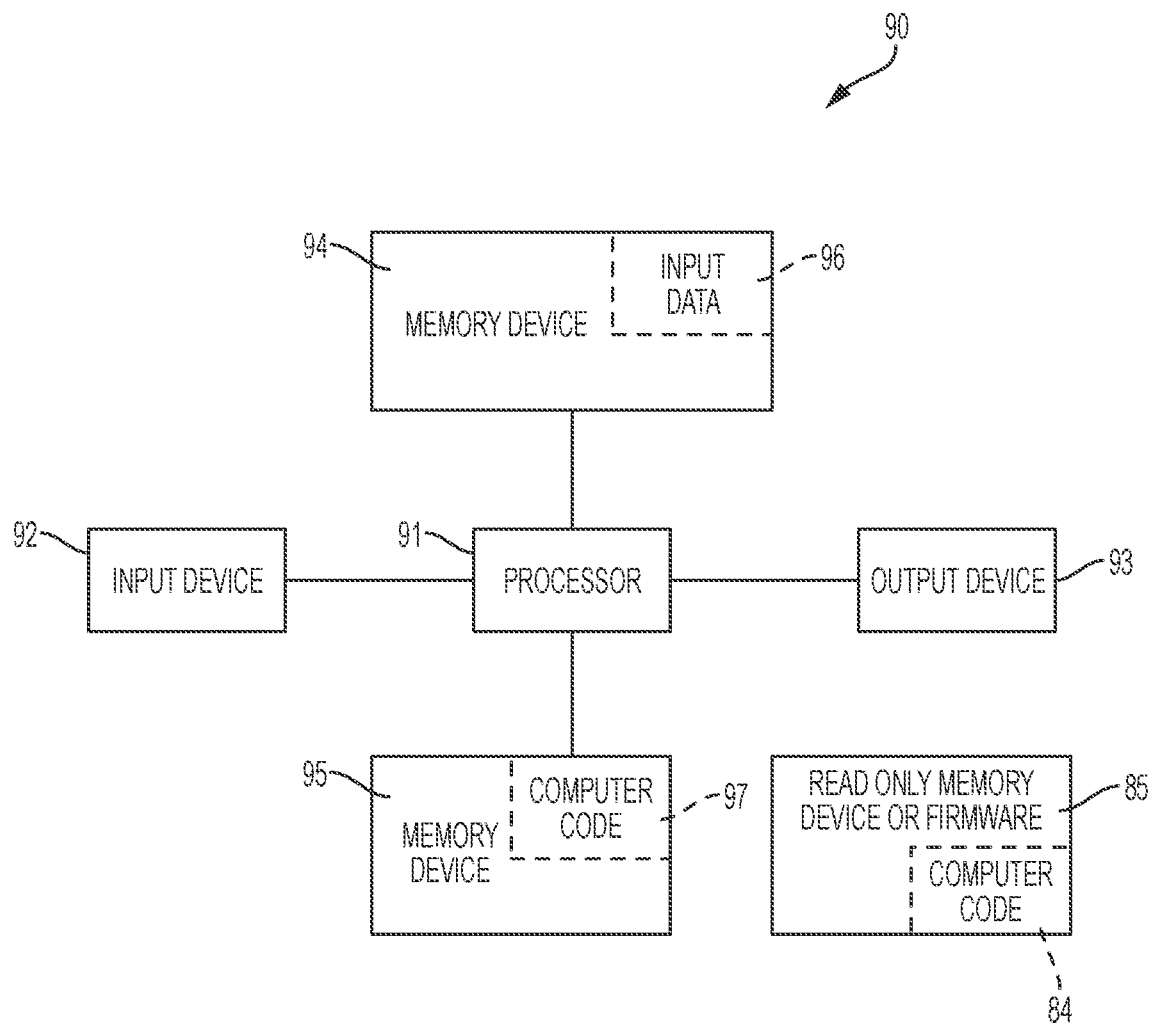
FIG. 4 illustrates a computer system used by the system of FIG. 1 for enabling a process for improving message software technology associated with connections and communications between hardware devices, in accordance with embodiments of the present invention.

FIG. 4 illustrates a computer system 90 (e.g., device 23, database system 21, hardware device 14a, and hardware device 14b of FIG. 1) used by or comprised by the system of FIG. 1 for improving message software technology associated with connections and communications between hardware devices, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/ or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for improving message software technology associated with connections and communications between hardware devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve message software technology associated with connections and communications between hardware devices. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving message software technology associated with connections and communications between hardware devices. In another embodiment, the invention provides a business method that performs the process steps of the invention on a subscription, advertising, and/or fee basis. That is, a service supplier, such as a Solution Integrator, could offer to enable a process for improving message software technology associated with connections and communications between hardware devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
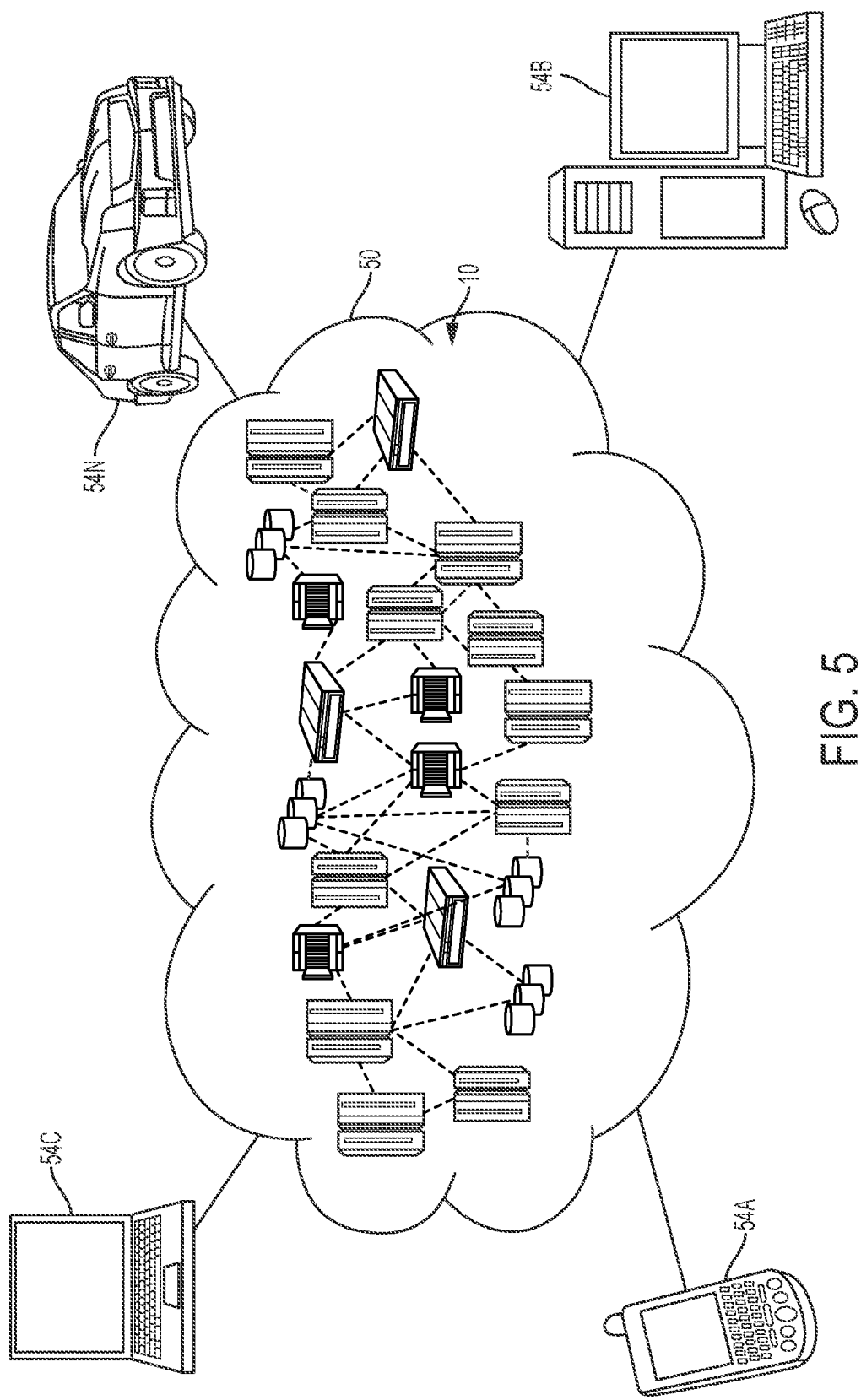
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
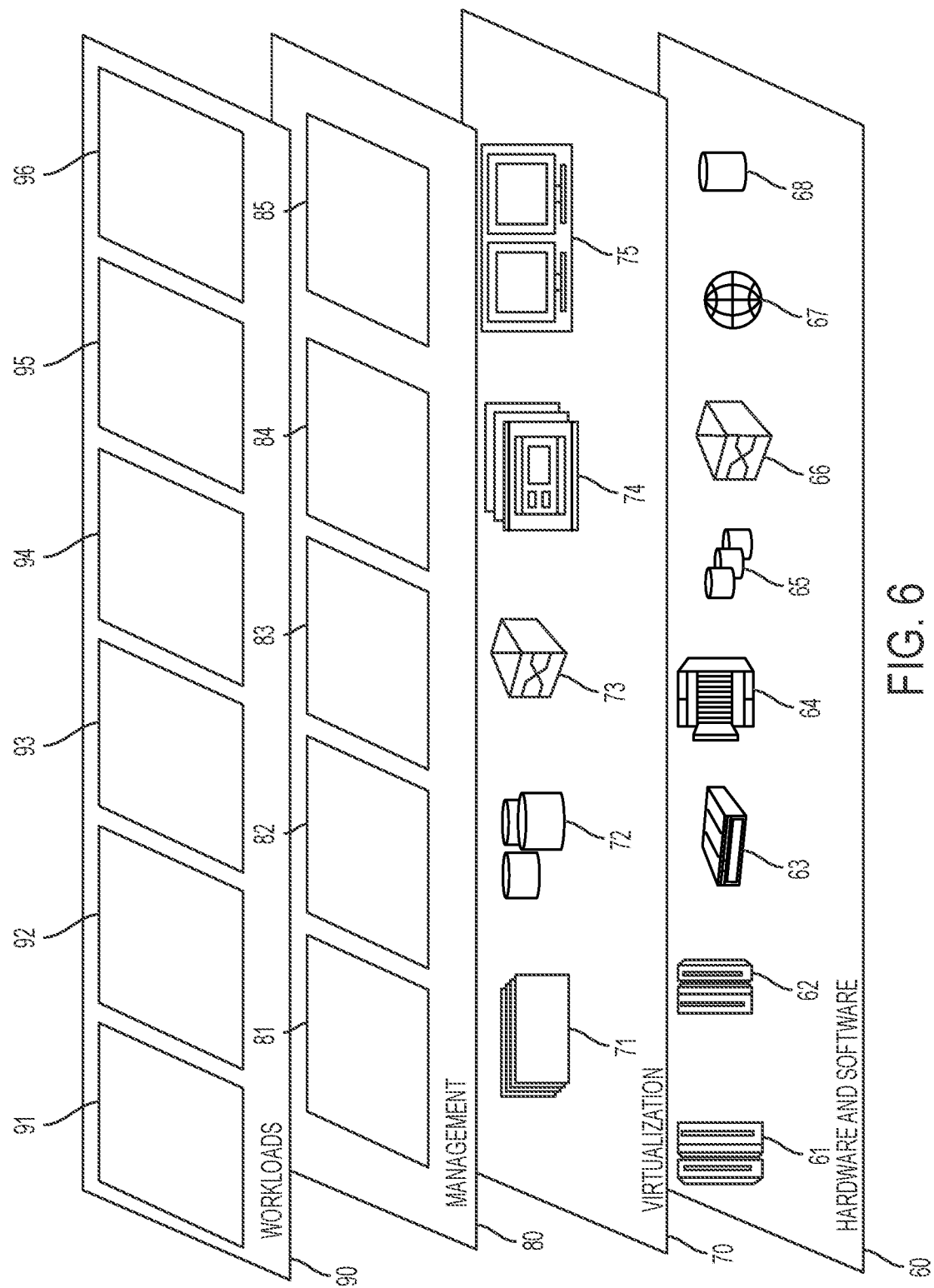
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving message software technology associated with connections and communications between hardware devices 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated online message linking improvement method comprising:

automatically selecting, by a processor of a messaging hardware device of a first user, specified keywords in an online transcript generated via a messaging software application of said messaging hardware device, said online transcript associated with said first user;

analyzing in real time, by said processor, said specified keywords with respect to additional keywords of additional previously generated online transcripts and technical skill based software tags stored within a remotely located specialized database repository, said additional previously generated online transcripts and said technical skill based software tags associated with a plurality of additional users;

determining, by said processor based on results of said analyzing, contribution attributes associated with associated communications between said plurality of additional users and said additional previously generated online transcripts with respect to said subject matter of said online transcript;

generating, by said processor based on results of said analyzing and said contribution attributes, software code indicating results of said analyzing and said contribution attributes;

executing, by said processor, said software code;

ranking in real time, by said processor in response to said executing said software code, said plurality of additional users within a multidimensional array of a specialized memory device thereby modifying a functionality of said specialized memory device;

iteratively scanning in real time, by said processor, said multidimensional array with respect to said technical skill based software tags;

generating, by a processor based on results of said iteratively scanning, matrix based weightings associated with said plurality of additional users;

automatically selecting, by said processor based on said matrix based weightings, a group of users of said plurality of additional users;

automatically connecting, by said processor based on results of said automatically selecting, messaging software applications of hardware devices of said group of users to said messaging software application of said messaging hardware device of said first user resulting in communications between said messaging software application of said messaging hardware device of said first user and messaging software applications of said hardware devices of said group of users;

automatically connecting, by said processor based on results of said communications between said messaging software application and said messaging software applications, said messaging hardware device to a hardware system requiring repair;

automatically diagnosing, by said processor, technical issues with said hardware system; and automatically repairing, by said processor, said technical issues with said hardware system.

2. The method of claim 1, wherein said ranking in real time is performed with respect to said additional keywords and said technical skill based software tags.

3. The method of claim 1, wherein said iteratively scanning is performed until a specified threshold has been exceeded.

4. The method of claim 1, wherein said technical issues comprise hardware based problems with said hardware system.

5. The method of claim 1, wherein said technical issues comprise software based problems with said hardware system.

6. The method of claim 1, wherein said messaging software application is hard coded within said messaging hardware device.

7. The method of claim 1, further comprising:

presenting, by said processor, said messaging software application of said messaging hardware device and said messaging software applications of said hardware devices via a specialized graphical user interface (GUI).

8. The method of claim 1, further comprising:

providing at least one support service for at least one of creating, integrating, hosting, maintaining, and deploying computer-readable code in the messaging hardware device, said code being executed by the computer processor to implement: said automatically selecting, said analyzing in real time, said determining, said generating said software code, said executing, said ranking in real time, said iteratively scanning in real time, said generating said matrix based weightings, said automatically selecting, and said automatically connecting.

9. A computer program product, comprising a computer readable hardware storage device storing a computer readable program code, said computer readable program code comprising an algorithm that when executed by a processor of a messaging hardware device implements an automated online message linking improvement method, said method comprising:

automatically selecting, by said processor, specified keywords in an online transcript generated via a messaging software application of said messaging hardware device, said online transcript associated with a first user of said messaging hardware device;

analyzing in real time, by said processor, said specified keywords with respect to additional keywords of additional previously generated online transcripts and technical skill based software tags stored within a remotely located specialized database repository, said additional previously generated online transcripts and said technical skill based software tags associated with a plurality of additional users;

determining, by said processor based on results of said analyzing, contribution attributes associated with associated communications between said plurality of additional users and said additional previously generated online transcripts with respect to said subject matter of said online transcript;

generating, by said processor based on results of said analyzing and said contribution attributes, software code indicating results of said analyzing and said contribution attributes;

executing, by said processor, said software code;

ranking in real time, by said processor in response to said executing said software code, said plurality of additional users within a multidimensional array of a specialized memory device thereby modifying a functionality of said specialized memory device;

iteratively scanning in real time, by said processor, said multidimensional array with respect to said technical skill based software tags;

generating, by a processor based on results of said iteratively scanning, matrix based weightings associated with said plurality of additional users;

automatically selecting, by said processor based on said matrix based weightings, a group of users of said plurality of additional users; and automatically connecting, by said processor based on results of said automatically selecting, messaging software applications of hardware devices of said group of users to said messaging software application of said messaging hardware device of said first user resulting in communications between said messaging software application of said messaging hardware device of said first user and messaging software applications of said hardware devices of said group of users;

automatically connecting, by said processor based on results of said communications between said messaging software application and said messaging software applications, said messaging hardware device to a hardware system requiring repair;

automatically diagnosing, by said processor, technical issues with said hardware system; and automatically repairing, by said processor, said technical issues with said hardware system.

10. The computer program product of claim 9, wherein said ranking in real time is performed with respect to said additional keywords and said technical skill based software tags.

11. The computer program product of claim 9, wherein said iteratively scanning is performed until a specified threshold has been exceeded.

12. The computer program product of claim 9, wherein said technical issues comprise hardware based problems with said hardware system.

13. The computer program product of claim 9, wherein said technical issues comprise software based problems with said hardware system.

14. The computer program product of claim 9, wherein said messaging software application is hard coded within said messaging hardware device.

15. The computer program product of claim 9, wherein said method further comprises:

presenting, by said processor, said messaging software application of said messaging hardware device and said messaging software applications of said hardware devices via a specialized graphical user interface (GUI).

16. A messaging hardware device comprising a processor coupled to a computer-readable memory unit, said memory unit comprising instructions that when executed by the computer processor implements an automated online message linking improvement method comprising:

automatically selecting, by said processor, specified keywords in an online transcript generated via a messaging software application of said messaging hardware device, said online transcript associated with a first user of said messaging hardware device;

analyzing in real time, by said processor, said specified keywords with respect to additional keywords of additional previously generated online transcripts and technical skill based software tags stored within a remotely located specialized database repository, said additional previously generated online transcripts and said technical skill based software tags associated with a plurality of additional users;

determining, by said processor based on results of said analyzing, contribution attributes associated with associated communications between said plurality of additional users and said additional previously generated online transcripts with respect to said subject matter of said online transcript;

generating, by said processor based on results of said analyzing and said contribution attributes, software code indicating results of said analyzing and said contribution attributes;

executing, by said processor, said software code;

ranking in real time, by said processor in response to said executing said software code, said plurality of additional users within a multidimensional array of a specialized memory device thereby modifying a functionality of said specialized memory device;

iteratively scanning in real time, by said processor, said multidimensional array with respect to said technical skill based software tags;

generating, by a processor based on results of said iteratively scanning, matrix based weightings associated with said plurality of additional users;

automatically selecting, by said processor based on said matrix based weightings, a group of users of said plurality of additional users; and automatically connecting, by said processor based on results of said automatically selecting, messaging software applications of hardware devices of said group of users to said messaging software application of said messaging hardware device of said first user resulting in communications between said messaging software application of said messaging hardware device of said first user and messaging software applications of said hardware devices of said group of users;

automatically connecting, by said processor based on results of said communications between said messaging software application and said messaging software applications, said messaging hardware device to a hardware system requiring repair;

automatically diagnosing, by said processor, technical issues with said hardware system; and automatically repairing, by said processor, said technical issues with said hardware system.

17. The messaging hardware device of claim 16, wherein said ranking in real time is performed with respect to said additional keywords and said technical skill based software tags.

18. The messaging hardware device of claim 16, wherein said iteratively scanning is performed until a specified threshold has been exceeded.

\* \* \* \* \*